United States Patent [19]

Skoog

[11] Patent Number: 4,462,601
[45] Date of Patent: Jul. 31, 1984

[54] PISTON-CYLINDER SEALING DEVICE

[76] Inventor: Knut A. Skoog, Vrakvägen 7, S-274 00 Skurup, Sweden

[21] Appl. No.: 123,116

[22] Filed: Feb. 21, 1980

[51] Int. Cl.$^3$ .............................................. F01B 29/10
[52] U.S. Cl. ...................................... 277/27; 277/29; 277/73; 123/193 P
[58] Field of Search ........................ 277/27, 73, 74, 29; 60/521, 522, 152; 123/55 A, 193 P

[56] References Cited

U.S. PATENT DOCUMENTS

| 270,036 | 1/1883 | Eimecke et al. | 60/521 |
|---|---|---|---|
| 1,778,200 | 10/1930 | Nibbs | 277/29 |
| 3,335,643 | 8/1967 | Wentworth | 123/193 P |
| 3,667,443 | 6/1972 | Currie et al. | 277/29 X |
| 3,927,529 | 12/1975 | Hakansson | 60/521 |
| 4,111,104 | 9/1978 | Davison, Jr. | 123/193 P X |
| 4,132,417 | 1/1979 | Lagergvist | 277/27 |
| 4,132,420 | 1/1979 | Lundholm | 277/160 |
| 4,154,207 | 5/1979 | Brehob | 277/73 X |

Primary Examiner—Steven M. Pollard
Attorney, Agent, or Firm—Finnegan, Henderson, Farabow, Garrett & Dunner

[57] ABSTRACT

The invention relates to a seal for a piston and a cylinder of a double-acting hot gas engine or other applications in which piston rings of plastic materials should be used.

A duct having low resistance against gas flow is provided between the high pressure of the seal and the bottom of a groove for the piston ring. The resistance against gas flow between the high pressure side and the piston ring along the piston and cylinder walls is substantially greater. Thus the piston ring will immediately be forced into a sealing position when the engine is pressurized.

6 Claims, 2 Drawing Figures

PISTON-CYLINDER SEALING DEVICE

PRIOR ART REFERENCES

U.S. Pat. Nos.:
3,927,529
4,132,417
4,132,420

BACKGROUND OF THE INVENTION

1. Field of the Invention

This invention relates to a sealing device for preventing leakage of gas between a piston and a cylinder, the piston being provided with continuous piston rings of plastic material.

2. Description of the Prior Art

Sealing devices of the type referred to are used e.g. in hot gas engines where a lube oil cannot be used because any oil entering into the gas charges of the engine would eventually be accumulated in the engine regenerators and block the gas flow. In double-acting hot gas engines the pistons separate the different gas charges and it is essential that the mean gas pressure is the same in all gas charges of the engine. If not the efficiency of the engine will be lowered.

In prior sealing devices the plastic piston rings have been backed by metal springs to ensure that the plastic rings are held against the surfaces to be sealed. Seals of this type have been described in the U.S. Pat. Nos. 4,132,420 and 4,132,417. The sealing function of said known devices is depending on the magnitude of the forces exerted by the metal springs. However, said forces will vary partly because the springs used in the various pistons are not completely alike, partly because the spring forces will vary dependant on the degree of wear of the plastic piston rings and all rings in all pistons will not be equally worn at any time. Consequently the unavoidable leakage between the pistons and the cylinder walls will not be of equal magnitude at all pistons of the engine and this will cause different mean pressures in the different working gas charges.

SUMMARY OF THE INVENTION

A sealing device for preventing gas leakage between a first space containing gas at a cyclically varying pressure and a second space containing gas at a pressure corresponding to the minimum value of the pressure in said first space, said device comprising two elements provided with co-axial cylindrical surfaces effecting relative movements in the direction of their common axis, the said surfaces being respectively concave and convex with the concave surface surrounding the convex surface, and the device comprising a continuous sealing ring in a groove in one of said surfaces and engaging the other of said surfaces when in normal operation, said groove having a greater dimension than said continuous sealing ring is according to the present invention characterised in that the element having the groove with the sealing ring is provided with a gas duct leading from said first space containing gas at cyclically varying pressure to the bottom of said groove. The accompanying drawing, which is incorporated in and constitute a part of this specification, illustrate an embodiment of the invention and serves to explain the principles of the invention.

DESCRIPTION OF THE PREFERRED EMBODIMENT

Reference will now be made in detail to the preferred embodiment of the invention illustrated in the accompanying drawing.

Figure 1:
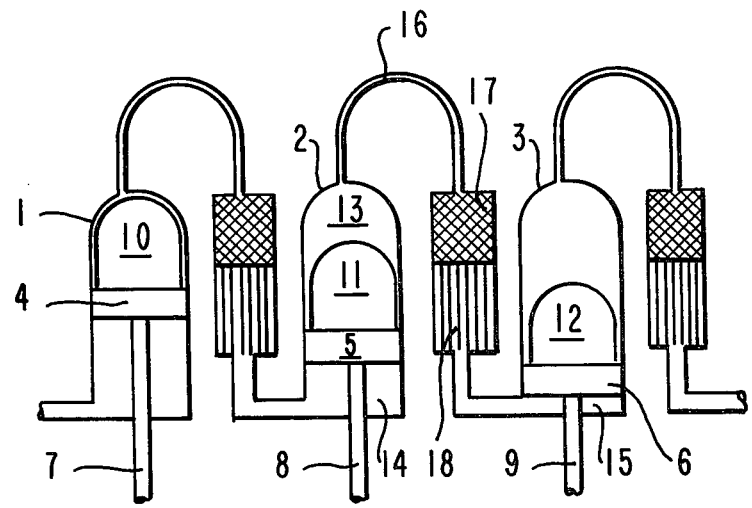
FIG. 1 is a schematic representation of a double-acting hot gas engine in which the invention may be advantageously used.

The basic principle of a double-acting hot gas engine will be understood from FIG. 1 in which a number of cylinders 1–3 is provided with pistons 4–6 each of which is carried by a piston rod 7–9 and provided with a dome 10–12.

Each piston—e.g. the piston 5—separates two variable volume chambers 13 and 14. The variable volume chamber 13 above the piston 5 is connected to a variable volume chamber 15 below the piston 6 in a neighbouring cylinder 3, the connection including a heater 16, a regenerator 17 and a cooler 18.

During operation of the engine a gas charge contained in the variable volume chambers 13 and 15 as well as in the heater 16, the regenerator 17 and the cooler 18 is oscillated between the two variable volume chambers and compressed mainly in the chamber 15 a low temperature while expanded mainly in the chamber 13 at a high temperature.

It is essential to the proper function of the engine that the mean gas pressure is the same in all the gas charges of the engine separated by the pistons.

In order to obtain such equal mean pressure each piston may be provided with two piston rings acting as non-return valves the low pressure side of which being connected to a hollow space in the piston dome. Such device has been described in the U.S. Pat. No. 3,927,529.

Figure 2:
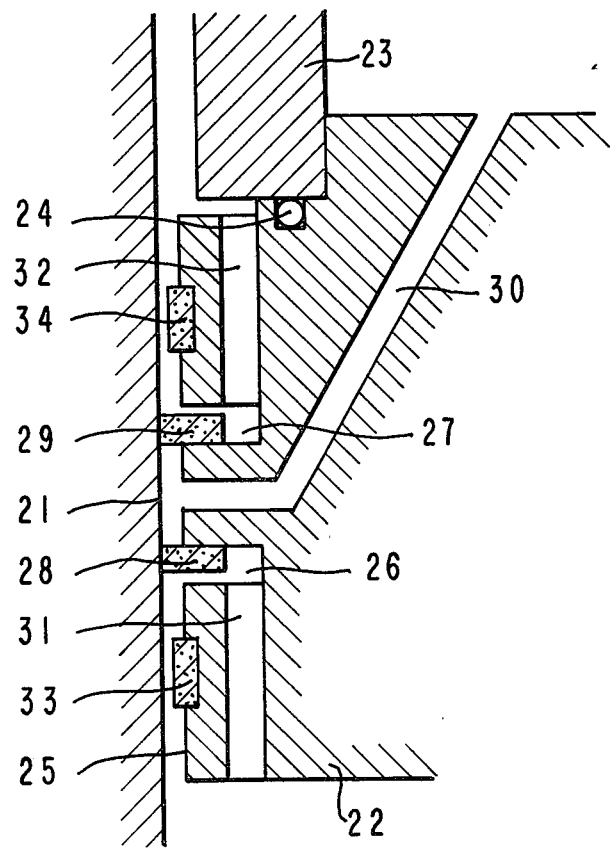
FIG. 2 is a vertical section through a sealing device according to the invention shown on a larger scale than used in FIG. 1.

FIG. 2 shows the details of the sealing device. A cylinder wall has been designated by reference numeral 21 and a piston by 22. A hollow dome 23 has been screwed on to the top of the piston 22 and sealed by an O-ring 24. The cylindrical piston surface 25 has been provided with grooves 26 and 27 adapted to receive continuous piston rings 28, 29 made of polytetrafluoroethylene reinforced with fibre glass. The axial dimension of the rings 28, 29 is just a little smaller than the axial dimension of the grooves 26 and 27. The space limited by the rings 28, 29 and the surfaces 21 and 25 is connected to the interior of the dome 23 by a duct 30. A number of equally angularly spaced bores 31 and 32 are forming a duct leading from the ends of the piston 22 to the grooves 26 and 27 respectively.

The piston 22 is also provided with supporting rings 33 and 34 made of fibre glass reinforced polytetrafluoroethylene. Said rings 33 and 34 serve to prevent direct contact between the surfaces 21 and 25 said surfaces being unlubricated metal surfaces.

The device described and shown in FIG. 2 will operate as follows:

Working gas is supplied to the variable volumes on both sides of the piston 22. The gap between the rings 33, 34 and the wall 21 is rather narrow and so is the axial gap between the piston rings 28, 29 and the grooves 26, 27. Therefore the relatively wide axial bores 31, 32 will cause the gas pressure to move the rings 28, 29 into the positions shown in FIG. 2 in which they prevent gas from entering into the duct 30 leading to the interior of the dome 23.

During cranking the engine at a starting operation the gas pressure will vary cyclically but due to the basic function of the piston rings 28, 29 as non-return valves (as described in U.S. Pat. No. 3,927,529) an equal mean gas pressure is maintained in all working gas charges.

If the piston rings 26, 27 have different ability to act as non-return valves gas may be permanently transported from one side of the piston to the other and this would cause a decrease in engine efficiency.

I claim:

1. An improved sealing device for preventing gas leakage between a first space containing gas at a cyclically varying pressure and a second space containing gas at a pressure corresponding to the minimum value of the pressure in said first space, said device including two elements provided with co-axial cylindrical surfaces effecting relative reciprocating movements in the direction of their common axis, the said surfaces being respectively concave and convex with the concave surface surrounding the convex surface, and the clearance between said surfaces defining a leakage flow path between the first and second spaces, a continuous sealing ring in a groove in one of said surfaces and slidingly engaging the other of said surfaces when in normal operation, said groove having a greater radial thickness than said continuous sealing ring for providing an annular space behind the ring, the improvement comprising gas duct means in the element having the groove with the sealing ring leading from said first space containing gas at cyclically varying pressure to the annular space behind said groove; and means for restricting the flow of gas in the portion of the leakage flow path between the first space and the sealing ring.

2. The improved sealing device as claimed in claim 1, wherein said restricting means includes a rigidly connected ring decreasing the gap between the concave and convex surfaces.

3. The improved sealing device as claimed in claim 1, wherein said duct means includes a number of evenly distributed bores leading from said first space containing gas at cyclically varying pressure to the annular space behind said ring.

4. An improved multi-cylinder double-acting Stirling cycle engine of the kind in which each cylinder contains a piston which separates a low temperature working space from a high temperature working space in the cylinder and each piston separates from each other two different charges of working gas operating in respective working cycles by means of at least two axially spaced piston rings positioned in associated grooves in the piston and having working gas conveyance means connected to each said cylinder with working gas therein maintained at minimum cycle pressure, each piston being provided with a cavity for receiving therein said working gas that may leak through one of said piston rings into the space between said two piston rings, at least one passage defined in said piston connecting said cavity to the space between said two piston rings thereby to permit entry of leakage gas into said cavity, and said two piston rings cooperating with their adjacent recess wall parts to act as non-return valves allowing unrestricted flow of gas only in the direction from said cavity to permit passage of working gas from said space between said two piston rings into said two charges for thereby maintaining said minimum cycle pressure in said cavity, the improvement comprising:

the rings having radial thicknesses less than the thicknesses of the associated grooves for providing an annular space behind each ring;

gas duct means in the piston communicating each high temperature space and each low temperature space directly with the annular space behind the respective proximate piston ring; and means for restricting the flow of working gas past the portions of the piston peripheral surface and adjacent cylinder wall between each high temperature space and each low temperature space and the respective proximate piston ring.

5. The improved engine of claim 4 wherein said restricting means includes a pair of rigidly connected rings positioned in each cylinder between the high and low temperature spaces and their respective proximate piston rings for decreasing the gap between the piston and the adjacent cylinder wall.

6. The improved engine of claim 4 wherein said duct means includes a plurality of evenly distributed bores leading from each high temperature space and each low temperature space to the annular spaces behind the respective proximate piston rings.

* * * * *